(12) United States Patent
Domagala

(10) Patent No.: US 7,333,732 B2
(45) Date of Patent: Feb. 19, 2008

(54) OPTICAL RECEIVER

(75) Inventor: Jerzy Domagala, Red Bank, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 344 days.

(21) Appl. No.: 11/026,564

(22) Filed: Dec. 30, 2004

(65) Prior Publication Data

US 2006/0147218 A1    Jul. 6, 2006

(51) Int. Cl.
*H04B 10/00* (2006.01)
*H04B 10/06* (2006.01)

(52) U.S. Cl. ..................... 398/155; 398/202

(58) Field of Classification Search ............... 398/140, 398/141, 155, 161, 183, 188, 202
See application file for complete search history.

(56) References Cited

U.S. PATENT DOCUMENTS

| | | | |
|---|---|---|---|
| 6,396,605 B1 * | 5/2002 | Heflinger et al. | ........... 398/140 |
| 6,690,884 B1 | 2/2004 | Kelty et al. | |
| 6,694,104 B1 | 2/2004 | Caplan et al. | |
| 6,760,142 B2 * | 7/2004 | Leuthold et al. | ............. 359/279 |
| 6,831,523 B1 * | 12/2004 | Pastorello et al. | ............ 331/25 |
| 6,941,078 B1 | 9/2005 | Onaka | |
| 2004/0213579 A1 | 10/2004 | Chew et al. | |
| 2005/0047780 A1 | 3/2005 | Hoshida et al. | |
| 2006/0067703 A1 | 3/2006 | Haunstein et al. | |

FOREIGN PATENT DOCUMENTS

| | | |
|---|---|---|
| EP | 0 502 386 A2 | 9/1992 |
| GB | 2 301 723 A | 12/1996 |

OTHER PUBLICATIONS

International Search Report with Written Opinion dated Jul. 25, 2006 received in corresponding PCT Patent Application No. PCT/US05/47318 (9 pages).

* cited by examiner

*Primary Examiner*—Jason Chan
*Assistant Examiner*—Quan-Zhen Wang
(74) *Attorney, Agent, or Firm*—Grossman, Tucker, Perreault & Pfleger, PLLC

(57) ABSTRACT

A receiver for a differentially phase shift keying formatted optical signal, such as an RZ-DPSK formatted optical signal. Dither control loops are provided for controlling path length in a demodulator and/or for controlling the center wavelength of an optical band pass filter. A feedback loop is provided for controlling the gain of a pre-amplifier, and a method of protecting against optical transients by disabling a pre-amplifier is also provided. A preset delay may be provided to compensate for the differential delay in paths associated with the demodulator arms. When the signal is an RZ-DPSK modulated signal, a clock for retiming data from the optical signal may be derived from a signal on the data path.

33 Claims, 5 Drawing Sheets

OPTICAL RECEIVER

TECHNICAL FIELD

The present application relates to the optical transmission of information and, more particularly, to a receiver for differential phase shift keying formatted optical signals.

BACKGROUND

Very long optical fiber transmission paths, such as those employed in undersea or transcontinental terrestrial lightwave transmission systems, are subject to decreased performance due to a host of impairments that accumulate along the length of the optical fiber in the transmission path. The source of these impairments within a single data channel includes amplified spontaneous emission (ASE) noise generated in Erbium-Doped Fiber-Amplifiers (EDFAs), nonlinear effects caused by dependence of the single-mode fiber's index on the intensity of the light propagating through it, and chromatic dispersion which causes different optical frequencies to travel at different group velocities. In addition, for wavelength division multiplexed (WDM) systems, where several optical channels are on the same fiber, crosstalk between channels caused by the fiber's nonlinear index can be problematic.

Distortions of the received waveform are influenced by design of the transmission line, as well as the shape of the transmitted pulses. Known long-haul systems have been implemented using On-Off-Keying (OOK), wherein the transmitted pulse is turned on and off with the ones and zeros of a data bit stream. On-Off-Keying may be implemented in a variety of well-known formats, such as Return-to-Zero (RZ), Non-Return to Zero (NRZ) and Chirped-Return-to-Zero (CRZ) formats. Generally, in a RZ format the transmitted optical pulses do not occupy the entire bit period and return to zero between adjacent bits, whereas in a NRZ format the optical pulses have a constant value characteristic when consecutive binary ones are sent. In a chirped format, such as CRZ, a bit synchronous sinusoidal phase modulation is imparted to the transmitted pulses.

Phase Shift Keying (PSK) is another modulation method known to those of ordinary skill in the art. In PSK modulation ones and zeros are identified by phase differences or transitions in the optical carrier. PSK may be implemented by turning the transmitter on with a first phase to indicate a one and then with a second phase to indicate a zero. In a differential phase-shift-keying (DPSK) format, the optical intensity of the signal may be held constant, while ones and zeros are indicated by differential phase transitions. DPSK modulation formats include RZ-DPSK, wherein a return-to-zero amplitude modulation is imparted to a DPSK signal, and CRZ-DPSK.

It has been recognized that the RZ-DPSK modulation format has particular advantages over other formats in WDM long-haul optical systems. For example, compared to OOK, RZ-DPSK modulation provides a significant reduction in the required optical signal-to-noise (OSNR) for a particular bit error rate (BER). As such, systems for imparting a RZ-DPSK modulation to WDM optical signals have been developed.

Receiver configurations for demodulating DPSK modulated optical signals are known. Known receiver configuration have included optical and electrical components such as an optical amplifier, e.g. a doped optical fiber amplifier, to amplify the received optical signal, a tunable band pass filter for removing out of band noise from the amplified optical signal, a tunable optical interferometer, such as a Mach-Zehnder type interferometer, and a dual balanced detector for converting the optical outputs of the interferometer into an electrical signal representative of the modulated data. Stable and accurate setting of the operating points for the receiver components, e.g. filter pass band wavelength, interferometer path length, receiver optical power level etc. is necessary to achieve optimal system BER. However, factors including manufacturing tolerances, temperature and aging can cause the component operating points to vary, thereby negatively affecting receiver performance. To actively control the receiver components operating points standard dithering control loops have been implemented. Known control loop configurations have, however, relied on unspecified parameters that can vary from receiver to receiver and/or require additional complex and expensive hardware in the data path causing decreased receiver performance.

For example one known method of controlling receiver optical power includes stabilizing the output power of an optical amplifier, which inherently includes the sum of a signal and wideband ASE noise. Another known method requires an extra optical splitter and photodiode at the optical filter output. A known method for controlling a DPSK interferometer includes providing feedback from the DC bias current of a subsequent photodiode(s). However, the baseband feedback from a DC bias current of a photodiodes depends on an "uncontrolled" data mark-to-space ratio and may be zero in an ideal case when the mark-to-space ratio is 1:1. Another known method of controlling a DPSK interferometer requires extra components (RF detectors) in data path.

In addition to controlling receiver component operating points, it is advantageous to control optical transients in the signal at the input of the receiver. As is known, optical transients in optically pre-amplified receivers can potentially destroy receiver components. During incoming signal loss (ISL) conditions, a receiver pre-amplifier, e.g. an EDFA, working in constant output power mode may set its gain to its maximum value. The ISL may be determined by detecting a signal level below a predetermined threshold. The threshold may be set below the nominal input operating range of the amplifier. When ISL is detected, the amplifier may be disabled until the input signal level increases above the threshold.

Modern systems incorporating forward error correction (FEC) may operate at input signal power levels below the amplifier nominal input operating range. The known approach for protecting against optical transients can, therefore, disable the input amplifier at times when the input signal is below the nominal input operating range, but high enough for reliable signal detection. This results in inefficient system operation.

In addition, known receiver configurations incorporate a clock recovery unit for extracting the data clock from an incoming data stream. Usually, the clock recovery unit is a narrow-band device with a tracking bandwidth of few MHz. This may result in a receiver configuration that is intolerant to high frequency jitter in the received signal.

There is therefore a need for a receiver configuration for efficiently and reliably demodulating a DPSK modulated optical signal.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
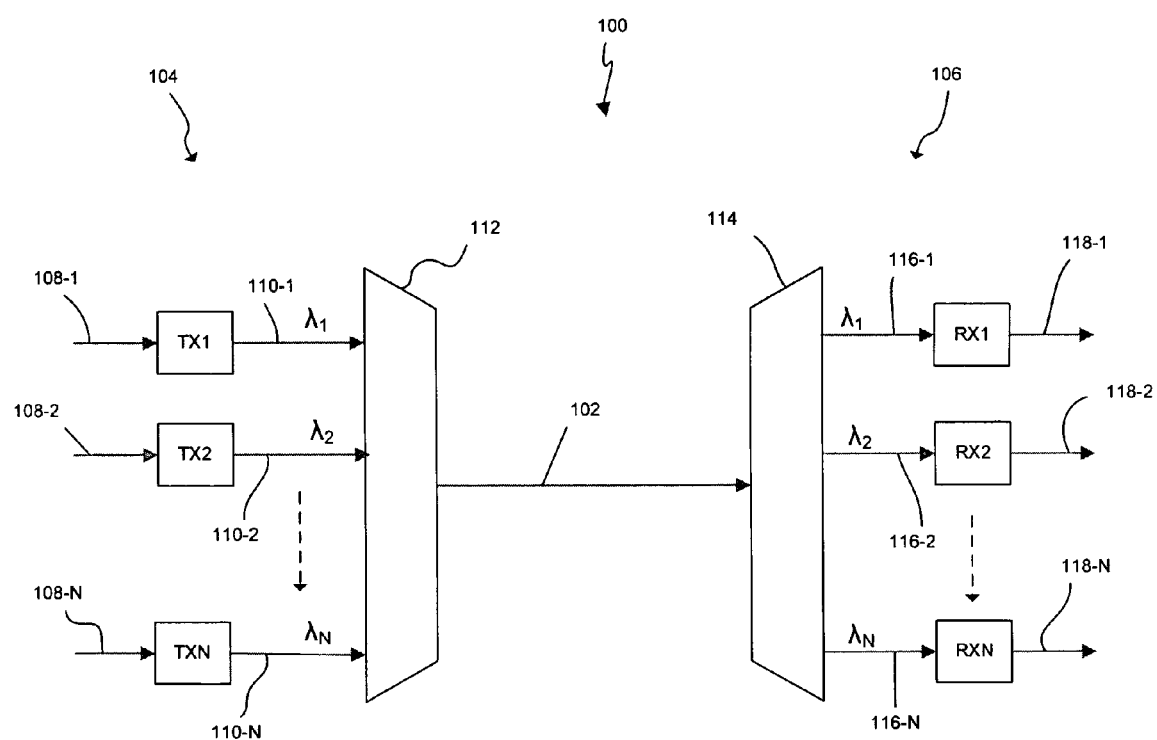
FIG. 1 is a simplified block diagram of one exemplary embodiment of a system consistent with the present invention.

FIG. 1 is a simplified block diagram of one exemplary embodiment of a WDM transmission system 100 consistent with the present invention. The transmission system serves to transmit a plurality of optical channels over an optical information path 102 from a transmitting terminal 104 to one or more remotely located receiving terminals 106. Those skilled in the art will recognize that the system 100 has been depicted as a highly simplified point-to-point system form for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the invention may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1$, $\lambda_2$ . . . $\lambda_N$. One or more of the transmitters TX1, TX2 . . . TXN may be configured to modulate data on the associated wavelength with a DPSK modulation format, e.g. an RZ-DPSK format. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information channel 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1$, $\lambda_2$ . . . $\lambda_N$ onto associated paths 116-1, 116-2 . . . 116-N coupled to associated receivers RX1, RX2 . . . RXN. One or more of the receivers RX1, RX2 . . . RXN may be configured to demodulate a DPSK modulated signal in a manner consistent with the present invention and provide an associated output data signal on an associated output path 118-1, 118-2, 118-3, 118-N.

To improve system BER, one or more of the transmitters in a system consistent with the invention may include an encoder for applying forward error correction (FEC) coding to the modulated data. As is known to those of ordinary skill in the art, FEC coding essentially involves incorporation of a suitable code into a data stream for the detection and correction of data errors about which there is no previously known information. Error correcting codes are generated for a stream of data (i.e. encoding) and are sent to a receiver. The receiver may include an FEC decoder for recovering the error correcting codes and uses the codes to correct any errors in the received stream of data (i.e. decoding).

Numerous error correcting codes are known, each with different properties that are related to how the codes are generated and consequently how they perform. Some examples of these are the linear and cyclic Hamming codes, the cyclic Bose-Chaudhuri-Hocquenghem (BCH) codes, the convolutional (Viterbi) codes, the cyclic Golay and Fire codes, and some newer codes such as the Turbo convolutional and product codes (TCC, TPC). Hardware and software configurations for implementing various error correcting codes are known to those ordinary skill in the art.

Figure 2:
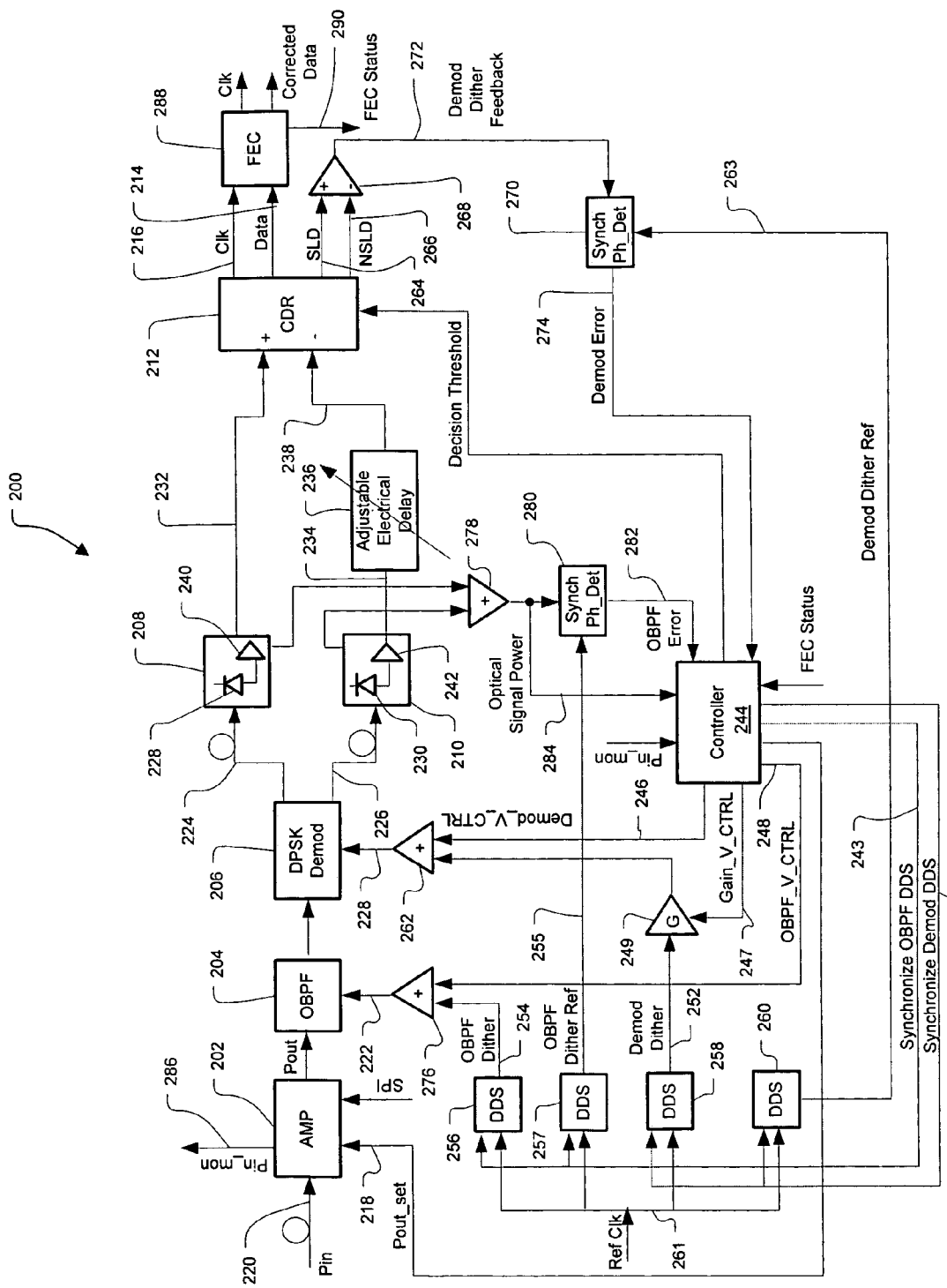
FIG. 2 is a simplified block diagram of one exemplary receiver consistent with the present invention.

Turning to FIG. 2, there is illustrated an exemplary receiver 200 consistent with the present invention. The illustrated exemplary embodiment includes an amplifier 202 for receiving and amplifying a DPSK modulated optical signal provided on path 220, a known tunable optical band pass filter (OBPF) 204, a known DPSK demodulator 206, and a dual balanced detector configuration including first 208 and second 210 photodetector and amplifier pairs coupled to a known clock and data recovery circuit (CDR) 212. The CDR provides and electrical outputs including retimed demodulated data on path 214 and the recovered data clock on path 216.

The amplifier 202 may be a known doped fiber amplifier, e.g. an erbium doped fiber amplifier (EDFA). As is known, a doped fiber amplifier configuration may include internal circuitry and one or more amplifier pumps for pumping a doped fiber to establish a selected operating mode. In a system consistent with the present invention, the output power of the amplifier 202 may be dynamically controlled by a control signal $P_{OUT\_SET}$ on path 218, as described in greater detail below, to stabilize signal power in the photodetectors 228 and 230 independently of the input signal level Pin, optical insertion losses of the OBPF and Demodulator, and coupling efficiency of the high speed photo-detectors and optical connectors and splices in the downstream path.

In the illustrated exemplary embodiment, the output of the amplifier 202 is coupled to the OBPF 204. A variety of tunable OBPF configurations are known to those of ordinary skill in the art. The OBPF 204 may be a single device configured for providing a tunable band pass characteristic, e.g. a tunable fiber Fabry-Perot filter, or may include combination of separate filters wherein one or more of the filters are tunable to establish a band pass characteristic associated with the combination. As described in detail below, the OBPF 204 may be tuned, e.g. in response to band pass filter control signal on path 222, to provide a narrow pass band having center wavelength aligned with the wavelength of the received optical signal. The OBPF 204 may thus filter most out-of-band noise, providing an output including only signal power and in-band noise. Although an OBPF 204 is illustrated in the exemplary embodiment of FIG. 2, it may be omitted in some embodiments.

The optical output of the OBPF 204 is coupled to the DPSK demodulator 206. The DPSK demodulator 206 may include a known interferometer, such as a Mach-Zehnder interferometer, configured to split light onto two separate optical paths/arms, one of which may have an optical path length 1-data bit longer than the other, and recombine the light interferometrically. One output of the DPSK demodulator 206, e.g. on path 224, may provide an optical signal resulting from constructive interference of the light from the two arms (the constructive output), while another output, e.g. on path 226, may provide an optical signal resulting from destructive interference of the light from the two arms (the destructive output).

As is known, to demodulate a DPSK optical signal, the DPSK demodulator 206 may be tuned, e.g. in response to a control signal on path 228, to establish the phase relationship of an optical carrier in the 1-bit delayed arm compared to that in the other arm at the point of interferometric recombination equal to $k\pi$, (where k is an integer value). When the DPSK demodulator 206 is properly tuned, the light from one output of the demodulator (constructive arm) represents digital "ones" intensity modulated on the optical signal, and the light from the other output (destructive arm) represents digital "zeros" intensity modulated on the optical signal.

The optical outputs of the DPSK demodulator 206 are imparted to the first 208 and second 210 photodetector and amplifier pairs, each of which includes an associated known high-speed photodetector 228, 230, e.g. pin photodiodes, and an known associated electrical amplifier, 240, 242. The photodetector and amplifier pairs, 208, 210 provide associated electrical outputs, e.g. on paths 232, 234 representative of the light imparted thereon. To compensate for the differential delay due to the manufacturing tolerances in both the constructive and destructive signal paths between the DPSK Demodulator 206 and the differential inputs of the CDR 212, one output may be coupled to an associated electrical delay circuit 236.

The electrical delay circuit 236 may provide a manually adjusted electrical delay with low insertion loss. The specific value of the delay may be predetermined and the electrical delay circuit 236 may be pre-set to impart the required delay or may be in-circuit adjusted to optimize transmission performance. The electrical delay circuit may take any of a variety of configurations known to those of ordinary skill in the art. In one embodiment, for example, the electrical delay circuit may be a known sliding coaxial delay line (trombone) that is either manually or step-motor controlled, or a known electronically controlled delay line IC.

The output of the electrical delay circuit, e.g. on path 238 and the output of the photodetector and amplifier pair 208 on path 232 may be coupled to the CDR circuit 212. A variety of CDR circuit configurations are known to those of ordinary skill in the art. The CDR circuit 212 may be configured from hardware, software, or a combination of hardware and software, and may include discrete and/or integrated components. In one embodiment, the CDR circuit may be an integrated circuit package, such as CDR model number VSC1238 commercially available from Vitesse.

In a receiver consistent with the present invention the output power of the amplifier 202 (and the optical power seen by photodetectors 228 and 230), the center wavelength of the OBPF 204, and/or the differential delay imparted in the DPSK demodulator 206 may be dynamically controlled in an efficient manner to compensate for the dependence of the amplifier-generated ASE noise as the function of its input signal level Pin, and to minimize the effects of drift associated, for example, with temperature and/or aging and wavelength dependent optical insertion losses. In the illustrated exemplary embodiment 200, control signals to the amplifier 202, OBPF 204 and DPSK demodulator 206 are established and controlled by a controller 244 in response to associated feedback signals. The controller may include one or more analog to digital converters for converting analog feedback signals to digital signals for processing by a digital signal processor (DSP). The controller may also include one or more digital to analog converters for providing analog output signals DEMOD V_CTRL, OBPF V_CTRL and $P_{OUT\_SET}$, e.g. on paths 246, 248, 218, which may establish operating points for the demodulator 206, OBPF 204 and amplifier 202, respectively.

Control of the demodulator 206 and the OBPF 204 may be achieved using dithering techniques, wherein a Demodulator Dither signal on path 252 is added to the DEMOD V_CTRL output of the controller 244 and provided as the demodulator control signal on path 228, and an OBPF Dither signal on path 254 is added to the OBPF V_CTR output of the controller 244 and provided as the OBPF control signal on path 222. A variety of circuits for establishing dither signals useful in connection with the present invention are known to those of ordinary skill in the art. In one embodiment, the Demodulator Dither signal and the OBPF Dither signal may be established by separate associated direct digital synthesizers (DDS) 256, 258 configured to generate a periodic dither signal at a predetermined frequency in response to a clock input on path 261. The dither signals may be low frequency periodic signals in the form of sine-wave, triangle-wave etc. As used herein, the term "low frequency" refers to a frequency that is at least an order of magnitude (i.e. a factor of 10) less than the modulator data rate.

To avoid interference between the dither frequencies in the respective demodulator and OBPF control loops, the demodulator and OBPF dither frequencies may be different frequencies related to each other by an integer multiplication factor. In one embodiment, for example, the Demodulator Dither $f_D$ signal may be about 20 Hz and the OBPF Dither $f_F$ signal may be about $n \times f_D$, e.g. 2000 Hz (when n=100). Those of ordinary skill in the art will recognize that a variety of other dither frequencies may be provided.

In general, the dither signals applied to the OBPF and demodulator control signals cause changes in the optical power and data signal levels in the demodulated signal at the dither signal frequency. Changes in the power or signal level at the dither frequencies are detected and compared to a dither reference signal to establish demodulator and OBPF error signals representing the energy at the associated dither frequencies. The presence of energy at a particular dither frequency indicates that its associated control setting is not optimum. The error values are provided to the controller 244 which establishes new values for the demodulator setting DEMOD V_CTRL and the OBPF setting OBPF V_CTRL. Optimum settings may be achieved by minimizing the associated error values.

In the illustrated exemplary embodiment, for example, the Demodulator Dither signal 252 may be added to the DEMOD V_CTRL output of the controller 244, e.g. by adder 262, and the combined signal may be provided as the demodulator control signal on path 228. The Demodulator Dither signal is established by the DDS 258 in response to a clock input on path 261. In one embodiment, the DPSK demodulator 206 may include an all-fiber Mach-Zehnder interferometer wherein the required optical carrier phase relationship at the end of interferometrically recombined arms is achieved by changing the temperature of one arm of the device relative to the other arm. A known micro-heater may be provided for heating one arm of the device in response to the demodulator control signal on path 228.

In the illustrated exemplary embodiment, the amplitude of the Demodulator Dither signal on path 252 may be adjusted as a function of the demodulator operating point established by the DEMOD V_CTRL output of the controller 244. The demodulator tuning process may be based on a thermal effect proportional to the square of the applied control voltage DEMOD V_CTRL. In order to maintain a constant modulation depth of the demodulator differential delay (optical phase at the interferometric recombination point), the amplitude of the Demodulator Dither signal on path 252 may be decreased when the control voltage DEMOD V_CTRL increases. As the result, the loop gain may be kept independent of the demodulator operating point and the dither induced transmission penalty may be minimized and/or made independent of the operating point. In the illustrated embodiment, a voltage controlled amplifier 249 may be coupled to the path 252 to control the gain of the Demodulator Dither signal in response to a GAIN_V_CTRL signal provided on path 247 by the controller 244. Other methods of controlling the amplitude of the Demodulator signal will be known to those of ordinary skill in the art. For example, gain control may be implemented in the DDS 258.

The Demodulator Dither signal causes a low frequency dither in the path length of the demodulator arm to which the micro heater is applied. This dither causes changes in the distribution of the output power between the constructive and destructive output arms of the demodulator 206 at the frequency of the dither signal and/or its harmonics. Consistent with the present invention, the changes may be detected using a signal level detector built into a commercially available CDR integrated circuit. This approach greatly simplifies the complexity of high speed data paths. In the illustrated embodiment, the positive (SLD) and negative (NSLD) outputs of the CDR signal level detector, e.g. on paths 264, 266, respectively, are converted to single ended signal in path 272 by a differential amplifier 268 providing a Demodulator Dither Feedback signal.

The Demodulator Dither Feedback signal is coupled, e.g. via path 272 to a known synchronous phase detector 270 where it is mixed with a Demodulator Dither Reference signal provided on path 263 by DDS 260. The output of the phase detector 270 on path 274 is a Demodulator Error signal indicating the energy in the output signal levels SLD and NSLD at the dither frequency. The presence of energy at the dither frequency indicates that the demodulator control setting DEMOD V_CTRL is not optimum.

The error signal may be coupled to the controller 244, e.g. through an analog to digital converter for converting the error signal to a digital error value for processing by the Controller. The controller 244 may include a DSP configured to establish a new demodulator setting DEMOD V_CTRL on path 246 in response to the error value. An optimum setting may be achieved by minimizing the error value.

Those of ordinary skill in the art will recognize numerous methods of minimizing the error values to achieve optimum bias settings. For example, the sign (+/−) of the error value may establish a direction of change in the demodulator setting DEMOD V_CTRL. The bias may be changed in any increment. Smaller incremental changes in the bias lead to increased bias resolution and accuracy. In one embodiment, the bias may be changed by a variable multiple of the error value, where the variable is a function of the demodulator's operating point (e.g. control voltage and its optical input power level). The optimum setting may be achieved when the same change of error value is achieved when the setting is changed in one direction and then back to the optimum, as is achieved when the setting is changed in the opposite direction and then back to the optimum. When the optimum setting is achieved, the error signal no longer contains a spectral component at the fundamental of the associated dither frequency. The error signal may still contain spectral components at harmonics of the dither frequency.

In the illustrated exemplary embodiment, use of the provisioned SLD and NSLD outputs of the known CDR integrated circuit 212 to establish the Demodulator Dither Feedback signal simplifies the high speed data path, i.e. the path traveled by the input signal from the amplifier 202 to the CDR circuit 212, since no additional components in the high speed path are required for detecting the change in output signal level or power at the dither frequency. This translates to improved transmission performance, lower cost, and smaller size for the receiver compared to configurations including such additional components.

In addition, in an embodiment incorporating an all-fiber Mach-Zehnder type DPSK demodulator 206 with a micro-heater for tuning the path length of one of the arms, use of a first DDS 258 to establish the Demodulator Dither signal and a second DDS 260 to establish the Demodulator Dither Reference signal to the synchronous phase detector 270 allows for timing adjustments relative to the dither feedback. In particular, the modulation bandwidth of known micro-heaters may be limited to a frequency range of a few hertz. This may result in a substantial phase shift of the Demodulator Dither Feedback signal, e.g. on path 272, compared to the Demodulator Dither signal on path 252.

Use of a first DDS 258 to establish the Demodulator Dither signal and a second DDS 260 to establish the Demodulator Dither Reference signal received by the synchronous phase detector 270 allows adjustment of the timing between the Demodulator Dither Feedback signal and the Demodulator Dither Reference signal without affecting the Demodulator Dither signal. The DDS 258 and the DDS 260 may synthesize associated outputs at the demodulator dither frequency from a common reference clock Clk provided on path 261. The timing of the Demodulator Dither Reference signal provided by DDS 260 may, however, by adjusted, e.g. by a control input Synchronize Demod DDS provided by the controller on path 241, to align the Demodulator Dither Reference signal with the Demodulator Dither Feedback signal.

For example, the controller 244 may be configured, e.g. through software, hardware or a combination of software and hardware, to allow for deterministic phase differences between the Demodulator Dither Reference signal and the Demodulator Dither Feedback signal. The optimal phase value for the Demodulator Dither Reference signal may be determined by purposefully misadjusting the demodulator setting DEMOD V_CTRL and measuring the error value as a function of the Demodulator Dither Reference signal phase value. The Demodulator Dither Reference Signal phase value may be set at a value that maximizes the error value (e.g., $V_{error} = V_{dith\_fdb} \times V_{dith\_ref} \times \cos(\phi_{dit\_fdb} - \phi_{dit\_ref})$ at the given operating point of the Demodulator.

The OBPF feedback loop may operate in a manner similar to the demodulator feedback loop. As shown in FIG. 2, the OBPF Dither signal 254 may be added to the OBPF control setting OBPF_CTRL output of the controller 244, e.g. by adder 276, and the combined signal may be provided as the OBPF control signal on path 222. The OBPF Dither signal on path 254 may be established by DDS 256 in response to the common clock input Clk 261 provided also to DDS 258 and DDS 260 and DDS 257. This approach helps to keep the OBPF dither frequency at a multiple factor of the Demodulator dither frequency, and may minimize interference between loops. The known OBPF 204 may be configured such that its center wavelength is adjustable in response to the OBPF control signal.

The OBPF Dither signal causes changes in filter's Insertion Loss and subsequently changes in optical signal power at the filter's output. Consistent with the present invention, the changes may be detected by monitoring the optical power in the downstream data path, e.g. by monitoring the bias currents of the high speed photodetectors 228, 230 coupled to the respective outputs of the demodulator 206. The corresponding output signals from the photodetectors, 228, 230 may be added by adder 278.

Dithering of the OBPF control input causes a change in amplitude at the dither frequency at the output of the adder 278. The adder output may be coupled to a known synchronous phase detector 280 where it is mixed with the OBPF Dither Reference signal provided by DDS 257 on path 255. Use of a first DDS 256 to establish the OBPF dither signal and a second DDS 257 to establish the OBPF Dither Reference signal to the synchronous phase detector 280 allows for timing adjustments relative to the dither feedback. In particular, the modulation bandwidth of known PZT-controlled OBPFs may be limited to a frequency range of few kHz. This may result in a substantial phase shift of the OBPF Dither Feedback signal, e.g. on path 284, compared to the OBPF Dither signal on path 254 applied to the OBPF control input.

The DDS 256 and the DDS 257 may synthesize associated outputs at the OBPF dither frequency from a common reference clock Clk provided on path 261. The timing of the OBPF Dither Reference signal provided by DDS 257 may, however, by adjusted, e.g. by a control input Synchronize OBPF DDS provided by the controller 244 on path 243, to align the OBPF Dither Reference signal with the OBPF Dither Feedback signal. For example, the controller 244 may be configured, e.g. through software, hardware or a combination of software and hardware, to allow for deterministic phase differences between the OBPF Dither Reference signal and the OBPF Dither Feedback signal. The optimal phase value for the OBPF Dither Reference signal may be determined by purposefully misadjusting the OBPF setting OBPF_V_CTRL and measuring the error value as a function of the OBPF Dither Reference signal phase value. The OBPF Dither Reference Signal phase value may be set at a value that maximizes the error value (e.g., Verror=$V_{dith\_fdb} \times V_{dith\_ref} \times \cos(\phi_{dit\_fdb}-\phi_{dit\_ref})$) at a given operating point of the OBPF.

The output of the phase detector 280 on path 282 represents an OBPF error signal indicating the energy in the output of the adder 278 at the dither frequency. The error signal may be coupled to the controller 244, e.g. through an analog to digital converter for converting the error signal to a digital error value signal for processing by the Controller. The controller may include a DSP configured to establish a new OBPF setting OBPF V_CTRL in response to the error value. An optimum setting may be achieved by minimizing the error value. The error value may be minimized using the manner described above in connection with the demodulator control loop.

In the illustrated exemplary embodiment, use of the outputs of the high speed photodetectors 228, 230 to establish the OBPF dither feedback signal simplifies the high speed data path since no additional components are required in the high speed path for detecting the change in signal power at the dither frequency. This translates to improved transmission performance, lower cost, and smaller size for the receiver compared to configurations including such additional components.

With continued reference to FIG. 2, the gain of the amplifier 202 may be dynamically controlled using feedback from the high speed photo detectors 228, 230 to stabilize the signal power in the demodulated optical signal, i.e. at the input of high speed photo-detectors 228 and 230. In the illustrated exemplary embodiment, the output of the adder 278 is an electrical signal representing the combined optical power detected by the high-speed photo detectors 228, 230. This output may be coupled to the controller 244 on path 284 as a Signal Power feedback signal. Alternatively, the DC output of the differential amplifier 268 may be provided as a signal power feedback signal. This leads to the stabilization of the amplitudes of the true and complementary data signals at the CDR inputs. The feedback signal from the high-speed photo detectors is independent of the current setting of the demodulator, and may be used as for the amplifier loop regardless of the status of the demodulator. The feedback from the level detector of the CDR circuit 212, e.g. the output of the amplifier 268, depends on the operating point of the Demodulator and may be used for the amplifier control loop when the demodulator is locked.

In the illustrated exemplary embodiment, the controller 244 may be configured, e.g. through software, hardware or a combination of hardware and software, to provide a $P_{OUT\_SET}$ signal to the amplifier on path 218 in response to the Signal Power feedback signal. The level of the $P_{OUT\_SET}$ signal may determine the gain imparted by the amplifier 202 to the incoming optical signal Pin on path 220. The controller may be configured to modify the $P_{OUT\_SET}$ signal in response to changes in the Signal Power feedback signal to keep the Signal Power feedback signal constant. The output power $P_{OUT}$ of the amplifier 202 may thus vary as the $P_{OUT\_SET}$ signal is varied by the controller 244 to maintain a constant Signal Power feedback signal. As a result, constant optical power is established at the input to the high-speed photodetectors, and, to some extent, constant data amplitudes are established at the input of the CDR circuit 212.

Since the high speed photodetectors 228, 230 are located after the OBPF 204, most of the out-of-band noise is filtered and only signal power and in-band noise reaches the photodetectors 228, 230. Controlling of the gain of the amplifier 202 in response to the output of the photodetectors 228, 230 thus results in improved signal power stabilization and overall receiver performance compared to configurations wherein the amplifier is operated in constant total (Signal and wideband ASE noise) output power mode. As is known, when the amplifier is operated in constant output power mode, the amplifier provides a constant output power with the ratio between the signal and noise depending on the input signal level and wavelength. In a system consistent with present invention wherein the signal power feedback signal is derived from the output of the photodetectors 228, 230, the signal power is stabilized independently of the signal level and wavelength of the optical input signal to the amplifier 202.

A receiver consistent with the present invention may also be configured to provide optical transient protection in a manner that accounts for low input signal power levels achievable using FEC coding. In general, a system consistent with the invention may be configured to disable the receiver pre-amplifier 202 to protect against an ISL condition only when the incoming optical signal is below a predetermined threshold and the receiver's FEC decoder cannot identify received data. Correspondingly, the amplifier 202 may be enabled when the incoming optical signal increases above the predetermined threshold. With this configuration, receiver operation is not interrupted as long as the receiver can recover the data from the incoming optical signal.

In the illustrated exemplary embodiment, for example, the amplifier 202 may include a known internal power detector for detecting the power level of the incoming optical signal and providing an output $P_{IN\_MON}$, e.g. on path 286, representative of the input power level. Also, the receiver's FEC decoder 288 may provide a status output, e.g. FEC Status on path 290, indicating whether data is being recovered from the incoming optical signal. The status output may, for example, be a known FEC decoder fault indicator, such as, OOF (out-of-frame), LOF (loss-of-frame), OOM (out of multi-frame), or LMF (loss-of-multi-frame).

The $P_{IN\_MON}$ output of the amplifier 286 may be coupled the controller 244, along with the status output of the FEC decoder 288. The controller 244 may provide an output over an interface to the amplifier 202, e.g. a SPI bus, to disable the amplifier when $P_{in}$ is below a predetermined threshold and the fault indicator is provided on the status output of the FEC decoder 288. The controller 244 may enable the amplifier 286 from a disabled condition when $P_{in}$ moves above the predetermined threshold.

Figure 3:
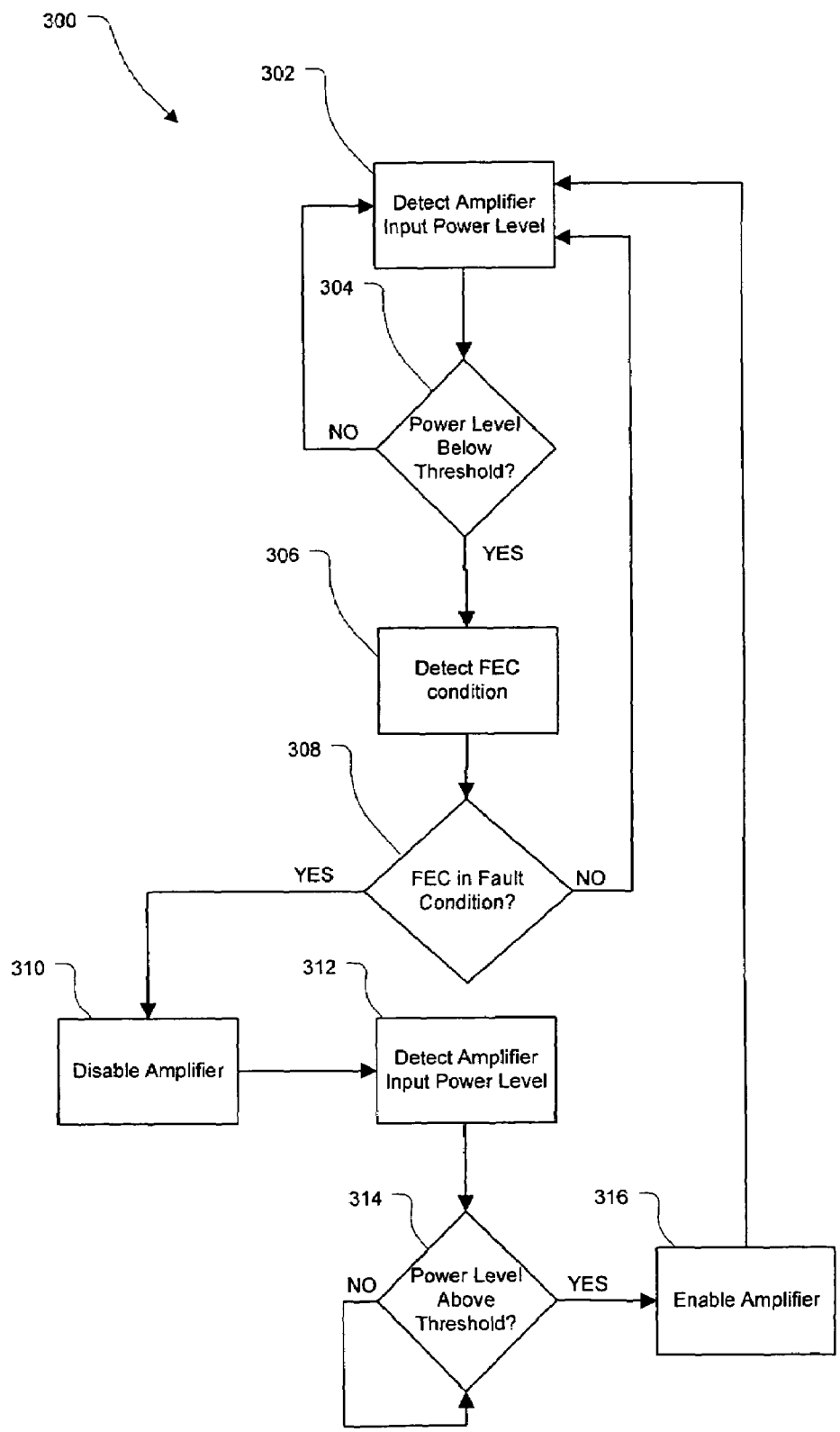
FIG. 3 is a block flow diagram illustrating an exemplary optical transient protection process consistent with the present invention.

FIG. 3 is a block flow diagram of one example a transient protection process 300 consistent with the present invention. The block flow diagram is illustrated with a particular sequences of steps. It can be appreciated, however, that the sequence of steps merely provides an example of how the general functionality described herein can be implemented. Further, each sequence of steps does not have to be executed in the order presented unless otherwise indicated.

In the exemplary embodiment, the amplifier input power level may be detected 302 and compared against a predetermined threshold 304. If the input power level is above the predetermined threshold 304, the input power level may be continually detected/monitored. If the input power level moves below the predetermined threshold 304, then the condition of the FEC decoder may be detected 306 and monitored for a fault condition 308. If the FEC decoder does not indicated a fault condition 308, then the amplifier may remain enabled and flow may pass back to step 302. If the FEC decoder indicates a fault condition 308, e.g. OOF, the amplifier may be disabled 310.

Once the amplifier is disabled, the amplifier input power level may be detected 312 and compared against the predetermined threshold 314. As long as the power level is below the threshold the comparison 314 may be repeated. Once the power level exceeds the predetermined threshold, the amplifier may be enabled 316 and flow may pass back to step 302.

A receiver consistent with the present invention may be configured to recover a data clock directly from the received signal to provide high jitter tolerance. In general, when data is modulated on an incoming optical signal in a RZ-DPSK format the data is carried by the phase modulation of the optical carrier, however the intensity modulation associated with the RZ-part of the modulation format carries the data clock. As a result, the clock may be recovered directly from the incoming optical signal by an intensity-demodulating device (e.g. standard photo-detector) or from the demodulated optical signal by taking advantage of the fact that both of the intensity modulated optical strings, i.e. the demodulated "ones" and "zeros", are available at the outputs of the DPSK Demodulator. Recovering the clock directly from the data stream allows use of relatively wide-band Clock Recovery CR circuits, resulting in a high frequency tolerant receiver.

Figure 4:
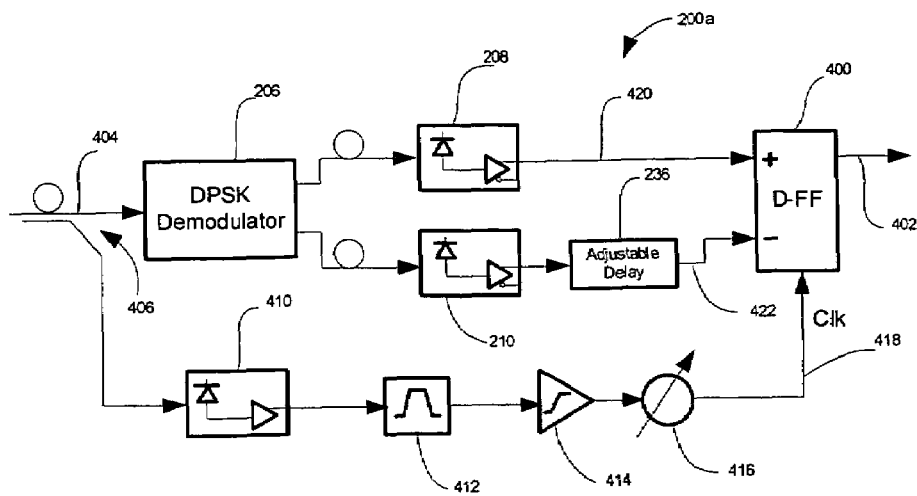
FIG. 4 is a simplified block diagram of another exemplary receiver consistent with the present invention.

FIG. 4 illustrates one exemplary embodiment of a receiver 200a consistent with the present invention where the RZ-DPSK optical input signal to the Demodulator is coupled to a D-flip-flop 400 as a Clk input. The output of the D-flip-flop 400, e.g. on path 402, may represent the recovered, re-timed and converted to NRZ format serial data stream. As shown, an optical tap 406 may be coupled to the input of the demodulator to tap-off a portion of the RZ_DPSK signal to an associated photodetector and amplifier pair 410. The output of the photodetector and amplifier pair 410 may be coupled to a band pass filter 412, e.g. having a bandwidth of several hundreds of MHz at a center frequency that is substantially equal to the bit rate. The output of the filter 412 may be coupled to a limiting amplifier 414 for reshaping the filtered signal. When the demodulator input is an RZ-DPSK modulated signal, the output of the limiting amplifier 414 may be a periodic electrical signal having a frequency equal to the frequency of the data clock. The output of the limiting amplifier 414 may be coupled to an electrical delay circuit 416 for imparting an adjustable delay to align the clock signal on path 418 with the data received at the input of the D-flip-flop e.g. on paths 420, 422.

Figure 5:
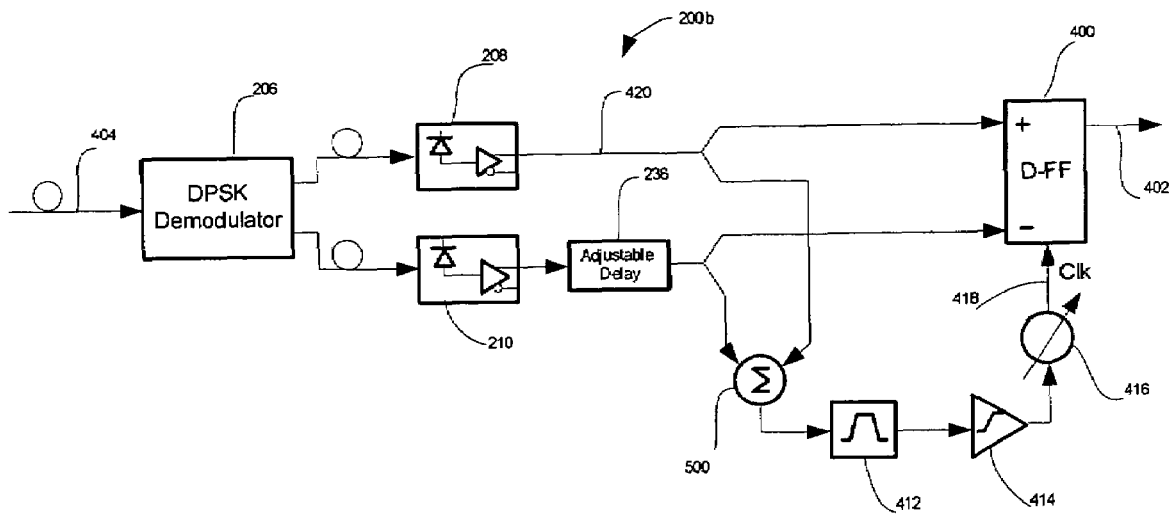
FIG. 5 is a simplified block diagram of another exemplary receiver consistent with the present invention.

Those of ordinary skill in the art will recognized that the incoming data stream may be tapped or detected at a variety of locations in the high speed data path to recover the data clock. FIG. 5, for example, illustrates an exemplary configuration 200b for recovering the data clock from and incoming RZ-DPSK formatted signal wherein the clock is recovered from the output of the photodetector and amplifier pairs 208, 210. As shown, the electrical outputs of the photodetector and amplifier pairs 208, 210 may be tapped after the adjustable delay 236, and combined by a coupler 500, e.g. a 6 dB coupler. The output of the coupler 500 may be coupled to a band pass filter 412, a limiting amplifier 414, and an electrical delay circuit 416 to produce a clock input Clk to the D-flip-flop 400.

Figure 6:
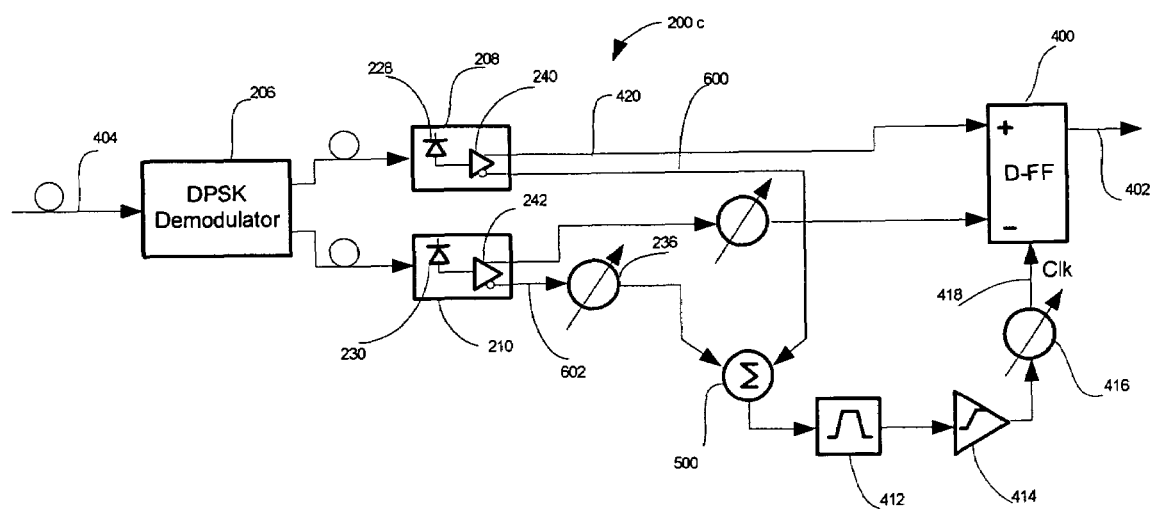
FIG. 6 is a simplified block diagram of another exemplary receiver consistent with the present invention.

Another alternative configuration 200c is illustrated in FIG. 6. As shown, inverted outputs of the amplifiers 240, 242 associated with the photodetectors 228, 230, respectively, may be provided, e.g. after the adjustable delay 236, to a coupler 500. The output of the coupler 500 may be coupled to a band pass filter 412, a limiting amplifier 414, and an electrical delay circuit 416 to produce a clock input Clk to the D-flip-flop 400. For the best high frequency jitter tolerance of the direct clock recovery architecture, for any of the mentioned configurations, the electrical length of the data path from the point where the clock path is initiated should be equal to that of the clock path.

There is thus provided a receiver for differential phase shift keying modulated optical signals that provides efficient and reliable demodulation. According to one aspect, there is provided an apparatus including: a demodulator for demodulating an optical input signal having data modulated thereon according to a DPSK modulation format, the demodulator being configured to split the optical input signal onto first and second arms and provide first and second optical outputs; first and second photodetectors, the first photodetector being configured for providing a first electrical output in response to the first optical output being imparted thereon, the second photodetector being configured for providing a second electrical output in response to the second optical output being imparted thereon; an integrated clock and data recovery circuit coupled to first and second electrical outputs, the integrated clock and data recovery circuit being configured to provide a signal level output representative of a signal level of at least one of the first and second electrical outputs; and a controller configured for providing a demodulator setting signal in response to the signal level output for controlling an optical path length of one of the first and second arms. There is also provided a method for stabilizing a demodulator configured to split a DPSK formatted optical input signal onto first and second arms and provide first and second optical outputs, the method including: coupling an output of the demodulator to an integrated clock and data recovery circuit, the integrated clock and data recovery circuit being configured to provide a signal level output representative of a signal level of at least one of the first and second outputs; and providing a demodulator setting signal in response to the signal level output for controlling an optical path length of one of the first and second arms.

According to another aspect of the invention, there is provided an apparatus including: a demodulator for demodulating an optical input signal, the demodulator being configured to split the optical input signal onto first and second arms and provide first and second optical outputs; a first dither circuit for establishing a demodulator dither signal; a controller configured for providing a demodulator setting signal; a combiner for combining the demodulator dither signal and the demodulator setting signal as a demodulator control signal for controlling an optical path length of one of the first and second arms; a second dither circuit for establishing a demodulator dither reference signal; and an error detection circuit for providing an error signal in response to a feedback signal representative of a signal level of at least one of the first and second optical outputs and the demodulator dither reference signal, the controller being configured for providing the demodulator setting signal in response to the demodulator error signal. There is also provided a method of stabilizing an demodulator configured to split an optical input signal onto first and second arms and provide first and second optical outputs, the method including providing a first dither circuit for establishing a demodulator dither signal; controlling an optical path length of one of the first and second arms in response to the demodulator dither signal and a demodulator setting signal; providing a second dither circuit for establishing a demodulator dither reference signal; and generating the demodulator setting signal in response to a feedback signal representative of a signal level of at least one of the first and second optical outputs and the demodulator dither reference signal.

According to another aspect of the invention, an apparatus including: a tunable optical band pass filter for receiving an optical input signal having data modulated thereon according to a DPSK modulation format; a demodulator coupled to an output of the band pass filter for demodulating the optical input signal, the demodulator being configured to split the optical input signal onto first and second arms and provide first and second optical outputs; first and second photo detectors, the first photodetector being configured for providing a first electrical output in response to the first optical output being imparted thereon, the second photodetector being configured for providing a second electrical output in response to the second optical output being imparted thereon; and a controller for providing a band pass filter setting signal in response to a feedback signal representative of signal power in the first and second electrical outputs for controlling a center wavelength of the band pass filter. There is also provided a method of controlling the center wavelength of an optical band pass filter in a receiver for receiving a DPSK formatted optical signal, the method including: coupling an output of the filter to a demodulator configured to split the optical signal onto first and second arms and provide first and second optical outputs; providing first and second photo detectors, the first photodetector being configured for providing a first electrical output in response to the first optical output being imparted thereon, the second photodetector being configured for providing a second electrical output in response to the second optical output being imparted thereon; and providing a band pass filter setting signal in response to a feedback signal representative of the first and second electrical outputs for controlling the center wavelength.

According to another aspect of the invention, there is provided an apparatus including: an optical amplifier for amplifying an optical signal having data modulated thereon according to a DPSK modulation format; an optical band pass filter coupled to the optical amplifier for receiving the optical signal; a demodulator coupled to the amplifier filter for demodulating the optical signal, the demodulator being configured to split the optical input signal onto first and second arms and provide first and second optical outputs; and a controller for providing an amplifier setting signal in response to a feedback signal representative of signal power in the first and second optical outputs for controlling a gain of the amplifier. There is also provided a method of controlling the gain of a optical pre-amplifier in a receiver for receiving a DPSK formatted optical signal, the method including: coupling an output of the amplifier to an optical band pass filter; coupling the output of the filter to a DPSK demodulator configured to split the optical signal onto first and second arms and provide first and second optical outputs; and providing an amplifier setting signal in response to a feedback signal representative of signal power in the first and second optical outputs for controlling the gain.

According to another aspect of the invention, there is provided an apparatus including: an optical amplifier for amplifying an optical input signal; a demodulator coupled to the amplifier for demodulating data from the optical input signal; an FEC decoder circuit configured to decode the data and to provide a fault indicator upon occurrence of a fault in decoding the data; and a controller configured for disabling the amplifier when a power level of the optical input signal is below a predetermined threshold and the fault indicator is provided by the FEC decoder. There is also provided a method of protecting against transients in an input signal applied to an optical amplifier of an optical signal receiver, the method including: monitoring a power level of the input signal; monitoring a fault condition of an FEC decoder for decoding data modulated on the optical signal; and disabling the optical amplifier when the power level is below a predetermined threshold and the fault condition of the FEC decoder is indicated.

According to another aspect of the invention, there is provided an apparatus including: a demodulator for demodulating an optical input signal having data modulated thereon according to a DPSK modulation format, the demodulator being configured to split the optical input signal onto first and second arms and provide first and second optical outputs; first and second photo detectors, the first photodetector being configured for providing a first electrical output in response to the first optical output being imparted thereon, the second photodetector being configured for providing a second electrical output in response to the second optical output being imparted thereon; a clock and data recovery circuit coupled to first and second electrical outputs, the clock and data recovery circuit being configured to provide an output representative of the data; and a electrical delay circuit coupled between the one of electrical outputs and the clock and data recovery circuit, the electrical delay circuit being configured to provide a predetermined and preset electrical delay of the corresponding electrical output relative to the other electrical output. There is also provided a method of compensating for a differential delay between first and second electrical outputs of associated first and second photodetectors in a receiver for an optical signal having data modulated thereon according to a DPSK modulation format, the method including: tuning a value of an electrical delay line to compensate for the differential delay; and setting its value to that corresponding to the best transmission performance.

According to another aspect of the invention, there is provided an apparatus including: a data path including: a demodulator for demodulating an optical input signal having data modulated thereon according to a RZ-DPSK modulation format, the demodulator being configured to split the optical input signal onto first and second arms and provide first and second optical outputs, and first and second photo detectors, the first photodetector being configured for providing a first electrical output in response to the first optical output being imparted thereon, the second photodetector being configured for providing a second electrical output in response to the second optical output being imparted thereon; a circuit coupled to the first and second electrical outputs, the circuit being configured to provide an electrical output data stream representative of the data in response to a clock input representative of a clock associated with the data; and a clock path coupling a portion of a signal on the data path to the circuit as the clock input. There is also provided a method of recovering data in an optical receiver having a data path including a demodulator for demodulating an optical input signal having the data modulated thereon according to a RZ-DPSK modulation format, the demodulator being configured to split the optical input signal onto first and second arms and provide first and second optical outputs, and first and second photo detectors, the first photodetector being configured for providing a first electrical output in response to the first optical output being imparted thereon, the second photodetector being configured for providing a second electrical output in response to the second optical output being imparted thereon, the method including: providing a circuit coupled to the first and second electrical outputs, the circuit being configured to provide an electrical output data stream representative of the data in response to a clock input representative of a clock associated with the data; and coupling a portion of a signal on the data path to the circuit as the clock input.

The embodiments that have been described herein but some of the several which utilize this invention and are set forth here by way of illustration but not of limitation. Many other embodiments, which will be readily apparent to those skilled in the art, may be made without departing materially from the spirit and scope of the invention.

What is claimed:

1. An apparatus comprising:
  a demodulator for demodulating an optical input signal having data modulated thereon according to a DPSK modulation format, said demodulator being configured to split said optical input signal onto first and second arms and provide first and second optical outputs;
  first and second photodetectors, said first photodetector being configured for providing a first electrical output in response to said first optical output being imparted thereon, said second photodetector being configured for providing a second electrical output in response to said second optical output being imparted thereon;
  an integrated clock and data recovery circuit coupled to first and second electrical outputs, said integrated clock and data recovery circuit being configured to provide a signal level output representative of a signal level of at least one of said first and second electrical outputs;
  a first dither circuit for establishing a demodulator dither signal;
  a controller configured for providing a demodulator setting signal in response to said signal level output; and
  a combiner for combining said demodulator dither signal and said demodulator setting signal as a demodulator control signal for controlling and dithering an optical path length of one of said first and second arms.

2. An apparatus according to claim 1, wherein said controller is configured to control said optical path length to achieve a phase relationship of $k\pi$, where k is in an integer value, between light traveling on said one of said first and second arms compared to light traveling on the other of said first and second arms.

3. An apparatus according to claim 1, said apparatus further comprising an error detection circuit for providing an error signal in response to said signal level output and a demodulator dither reference signal, and wherein said demodulator setting signal is provided by said controller in response to said demodulator error signal.

4. An apparatus according to claim 3, wherein said controller is configured to adjust said demodulator setting signal to minimize said demodulator error signal.

5. An apparatus according to claim 3, wherein said error detection circuit comprises a synchronous phase detector.

6. An apparatus according to claim 3, said apparatus comprising a second dither circuit for establishing said demodulator dither reference signal.

7. An apparatus according to claim 6, wherein said demodulator dither signal and said demodulator dither reference signal are established by said first and second dither circuits, respectively, in response to a common clock input.

8. An apparatus according to claim 6, wherein said second dither circuit is configured for imparting a selectable relative phase difference between said demodulator dither signal and said demodulator dither reference signal.

9. An apparatus according to claim 6, wherein said first and second dither circuits comprise separate direct digital synthesizers.

10. An apparatus according to claim 1, said apparatus further comprising an amplifier configured to receive said demodulator dither signal and establish an amplitude of said demodulator dither signal in response to an amplitude of said demodulator setting signal.

11. An apparatus according to claim 1, wherein said DPSK format is a RZ-DPSK format.

12. An apparatus according to claim 1, wherein said demodulator comprises a Mach-Zehnder demodulator.

13. An apparatus according to claim 1, wherein said integrated clock and data recovery circuit is configured to provide first and second ones of said signal level outputs, and wherein said controller is configured for providing said demodulator setting signal in response to said first and second signal level outputs.

14. A method of stabilizing a demodulator configured to split a DPSK formatted optical input signal onto first and second arms and provide first and second optical outputs, said method comprising:
  coupling an output of said demodulator to an integrated clock and data recovery circuit, said integrated clock and data recovery circuit being configured to provide a signal level output representative of a signal level of at least one of said first and second outputs; and providing a demodulator dither signal;

providing a demodulator setting signal in response to said signal level output; and combining said demodulator dither signal with said demodulator setting signal as a demodulator control signal for controlling and dithering an optical path length of one of said first and second arms.

15. A method according to claim 14, said demodulator setting signal is configured to establish a phase relationship of $k\pi$, where k is in an integer value, between light traveling on said one of said first and second arms compared to light traveling on the other of said first and second arms.

16. A method according to claim 14, said method further comprising generating a demodulator error signal in response to said signal level output and a demodulator dither reference signal, and wherein said demodulator setting signal is provided in response to said demodulator error signal.

17. A method according to claim 16, said method further comprising providing a first dither circuit for establishing said demodulator dither signal and providing a second dither circuit for establishing said demodulator dither reference signal.

18. A method according to claim 17, wherein said demodulator dither signal and said demodulator dither reference signal are synthesized by said first and second dither circuits, respectively, in response to a common clock input.

19. A method according to claim 16, said method further comprising imparting a phase difference between said demodulator dither signal and said demodulator dither reference signal.

20. A method according to claim 14, said method further establishing an amplitude of said demodulator dither signal in response to an amplitude of said demodulator setting signal.

21. A method according to claim 14, wherein said integrated clock and data recovery circuit is configured to provide first and second ones of said signal level outputs, and wherein said controller is configured for providing said demodulator setting signal in response to said first and second signal level outputs.

22. An apparatus comprising:

a demodulator for demodulating an optical input signal, said demodulator being configured to split said optical input signal onto first and second arms and provide first and second optical outputs;

a first dither circuit for establishing a demodulator dither signal;

a controller configured for providing a demodulator setting signal;

a combiner for combining said demodulator dither signal and said demodulator setting signal as a demodulator control signal for controlling and dithering an optical path length of one of said first and second arms;

a second dither circuit for establishing a demodulator dither reference signal; and an error detection circuit for providing an error signal in response to a feedback signal representative of a signal level of at least one of said first and second optical outputs and said demodulator dither reference signal, said controller being configured for providing said demodulator setting signal in response to said demodulator error signal.

23. An apparatus according to claim 22, wherein said demodulator dither signal and said demodulator dither reference signal are established by said first and second dither circuits, respectively, in response to a common clock input.

24. An apparatus according to claim 22, wherein said second dither circuit is configured for imparting a selectable phase difference between said demodulator dither signal and said demodulator dither reference signal.

25. An apparatus according to claim 22, wherein said first and second dither circuits comprise separate direct digital synthesizers.

26. An apparatus according to claim 22, said apparatus further comprising an amplifier configured to receive said demodulator dither signal and establish an amplitude of said demodulator dither signal in response to an amplitude of said demodulator setting signal.

27. An apparatus according to claim 22, wherein said error detection circuit comprises a synchronous phase detector.

28. An apparatus according to claim 22, wherein said demodulator comprises a Mach-Zehnder demodulator.

29. A method of stabilizing an demodulator configured to split an optical input signal onto first and second arms and provide first and second optical outputs, said method comprising:

providing a first dither circuit for establishing a demodulator dither signal;

controlling and dithering an optical path length of one of said first and second arms in response to said demodulator dither signal and a demodulator setting signal;

providing a second dither circuit for establishing a demodulator dither reference signal; and generating said demodulator setting signal in response to a feedback signal representative of a signal level of at least one of said first and second optical outputs and said demodulator dither reference signal.

30. A method according to claim 29, said method further comprising imparting a phase difference between said demodulator dither signal and said demodulator dither reference signal.

31. A method according to claim 29, wherein said first and second dither circuits comprise separate direct digital synthesizers.

32. A method according to claim 29, said method further establishing an amplitude of said demodulator dither signal in response to an amplitude of said demodulator setting signal.

33. A method according to claim 29, wherein said demodulator comprises a Mach-Zehnder demodulator.

* * * * *